J. T. BERTHELOTE.
COÖPERATING COUNTER GATES.
APPLICATION FILED DEC. 29, 1915.
1,192,600.
Patented July 25, 1916.
3 SHEETS—SHEET 3.
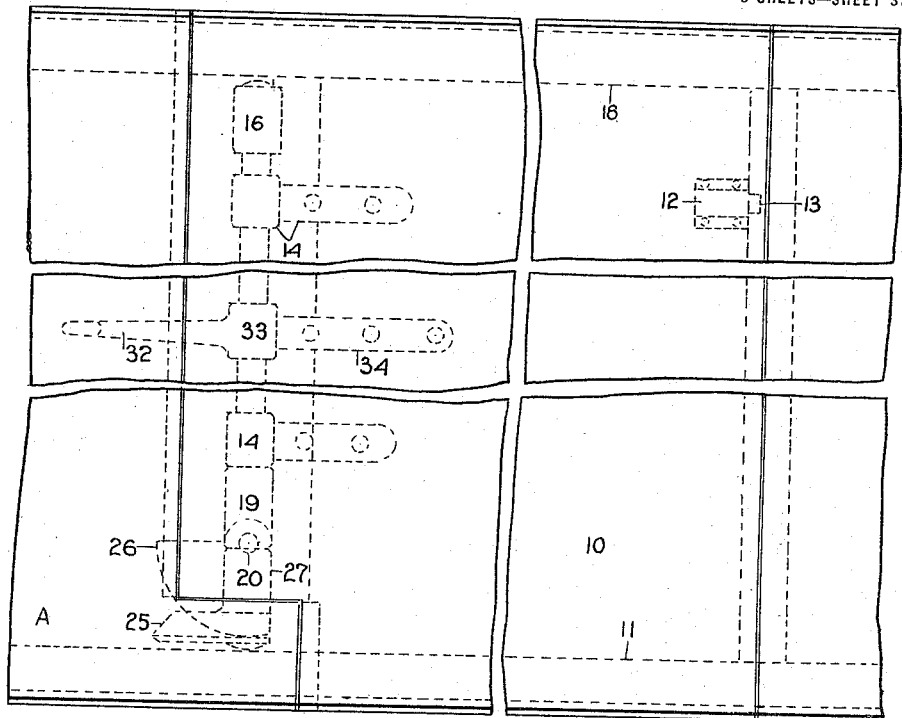
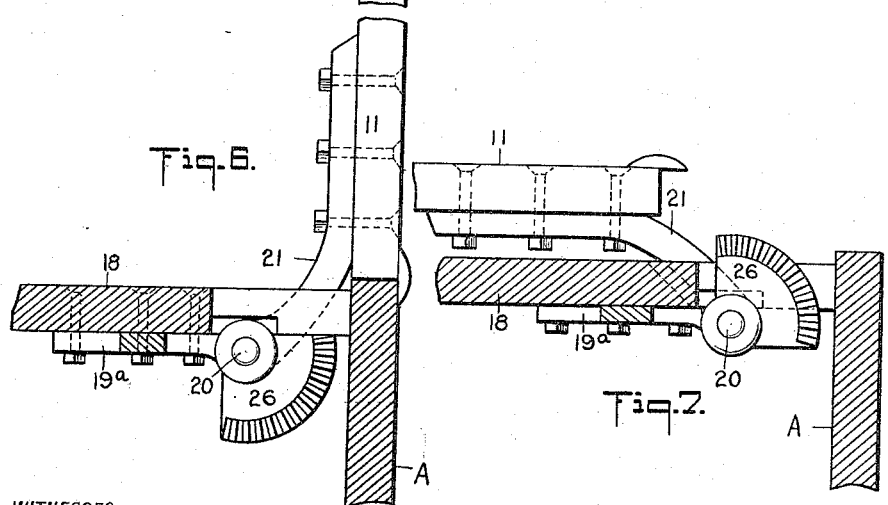
WITNESSES
INVENTOR
Joseph T. Berthelote
BY
ATTORNEYS

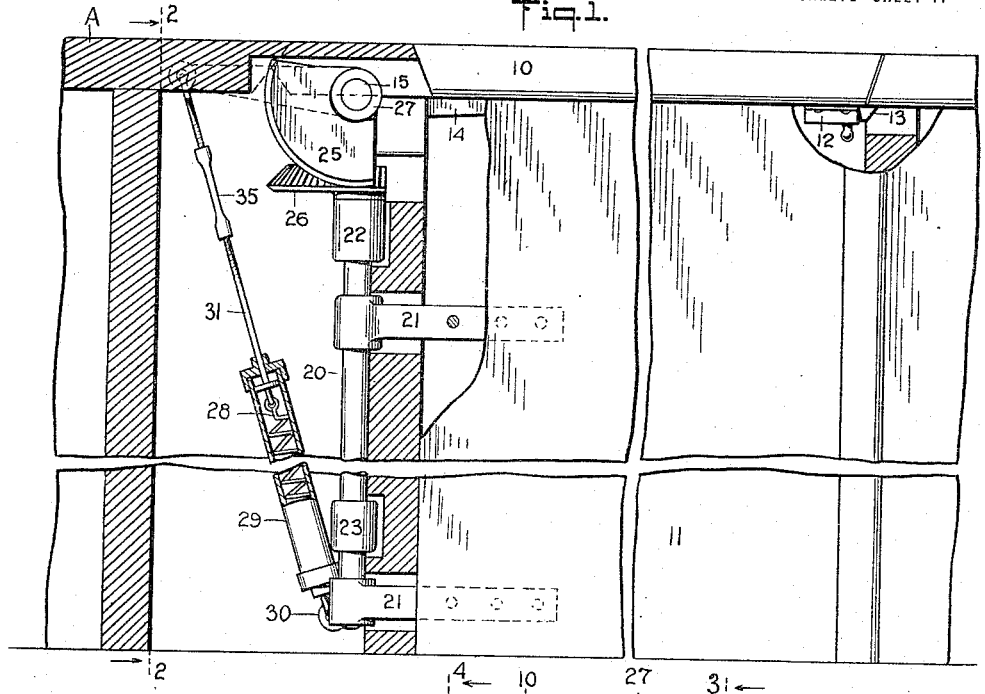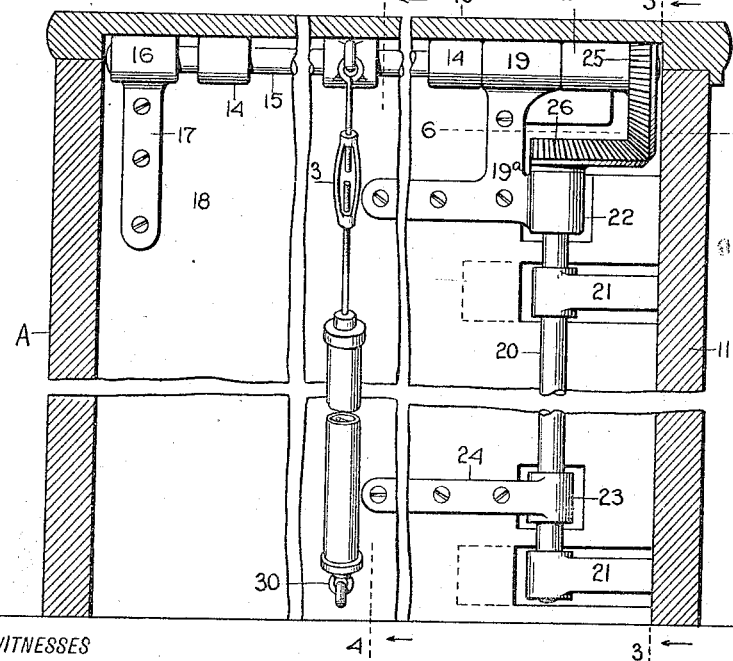

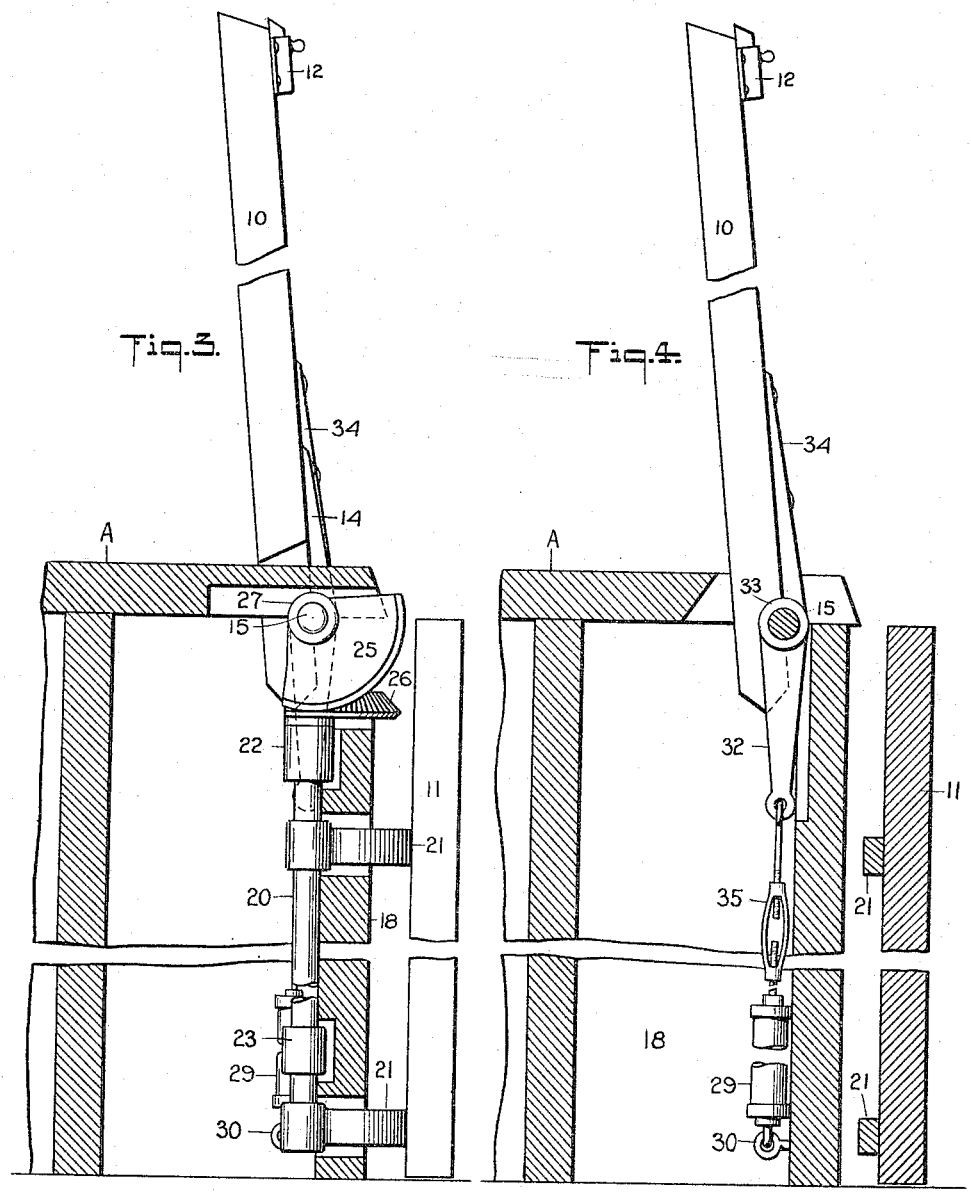

UNITED STATES PATENT OFFICE.

JOSEPH T. BERTHELOTE, OF HAVRE, MONTANA.

COÖPERATING COUNTER-GATES.

1,192,600.  Specification of Letters Patent.  Patented July 25, 1916.

Application filed December 29, 1915. Serial No. 69,194.

*To all whom it may concern:*

Be it known that I, JOSEPH T. BERTHELOTE, a citizen of the United States, and a resident of Havre, in the county of Hill and State of Montana, have invented new and Improved Coöperating Counter-Gates, of which the following is a full, clear, and exact description.

My invention relates to gates for counters and particularly to counters provided with a side gate and a top gate so that the two gates require to be opened, the one vertically and the other horizontally.

My invention provides gate-operating means comprising coöperative interengaging elements on the top gate and side gate whereby the raising and lowering of the top gate will open and close the side gate.

The invention will be particularly explained in the specific description following.

Reference is to be had to the accompanying drawings forming a part of this specification in which similar reference characters indicate corresponding parts in all the views.

Figure 1 is an elevation of counter gates embodying my invention, parts being broken out and others shown in vertical section; Fig. 2 is a transverse vertical section on the line 2—2, Fig. 1; Fig. 3 is a section on the line 3—3, Fig. 2, the view corresponding, in general, with Fig. 1 except that the gates are shown open; Fig. 4 is a vertical section on the line 4—4, Fig. 2, showing the gates open; Fig. 5 is a plan view; Fig. 6 is a detail horizontal section on the line 6—6, Fig. 2, showing the side gate closed; and Fig. 7 is a view similar to Fig. 6 but showing the side gate open.

In the illustrated example of my invention, a top gate 10 is provided arranged to swing vertically and disposed in a counter directly above a side gate 11, mounted to swing horizontally, that is to say, the top gate 10 swings on a horizontal axis and the side gate 11 swings on a vertical axis. The top gate is shown as having a known form of latch 12, the bolt of which is adapted to engage a fixed catch 13 on the counter A, but it will be understood that any approved arrangement of latch devices may be employed in practice.

To hingedly mount the top gate 10, the same is provided with straps 14 secured to the horizontal hinge pin or shaft 15. The shaft 15 turns in suitable fixed bearings on the counter, there being shown a strap 17 affording a bearing 16 for one end of the shaft, the strap being secured to a vertical leg or other vertical support 18, forming part of the counter structure. The shaft 15 turns near its opposite end in a second bearing 19 on a strap 19$^a$ which is also secured to the leg 18 or a like fixed support.

The preferred means for mounting the side gate 11 includes a vertical hinge pin or shaft 20 which is secured to the gate 11 by straps 21 or equivalent means and turns in fixed bearings, there being shown an upper sleeve bearing 22 integral with the strap 19$^a$ below and at right angles to the bearing 19 on the shaft 15, and a lower bearing 23 on a hinge strap 24 secured to the support 18.

In order to cause the opening and closing of the side gate 11 by the raising and lowering of the top gate 10, I provide intermeshing toothed sectors 25, 26, on the shafts 15, 20, respectively. The toothed sector 25 is disposed in a vertical plane at the under side of the top gate 10, said sector being integral with a sleeve 27 secured on the shaft 15. The sector 26 is keyed or otherwise made fast to the shaft 20. It will thus be apparent that when the top gate 10 is raised, the sector 25 will turn the sector 26 and shaft 20 and thus through the straps 21 or equivalent connections with the gate 11, swing the said gate to the open position as indicated in Fig. 7. By the lowering of the top gate 10 the reverse movements of the sectors, 25, 26, will swing the gate 11 to the closed position as shown in Fig. 6. Advantageously the top gate 10 may have a counter-balancing spring 28 arranged in connection therewith. Said spring 28 is disposed in a cylinder 29 pivotally connected at its lower end 30 to the support 18 or other fixed element. The upper end of the spring is connected with a rod 31 which extends through the cylinder head and is connected at its upper end with an arm 32 on the shaft 15, said arm being suitably secured to said shaft or to any member turning with the shaft as by means of integral hub 33 and strap 34. The rod 31 is advantageously fitted with a turn buckle 35 to regulate the tension of the spring 28, whereby it will act to counterbalance the top gate 10 in an obvious manner.

Having thus described my invention I claim as new and desire to secure by Letters Patent:

In a counter, a top gate, hinged to swing in a vertical plane, a side gate, a gear connection between the hinge of the top gate and the hinge of the side gate to swing the side gate by the raising and lowering of the top gate, a counter-balance spring for the top gate, a cylinder in which the said spring is mounted, the cylinder being pivoted at its lower end, a rod connected with the said spring and extending through the cylinder, and an arm on the top gate to which the opposite end of said rod is connected.

In testimony whereof I have signed my name to this specification in the presence of two subscribing witnesses.

JOSEPH T. BERTHELOTE.

Witnesses:
 JOHN H. DEVINE,
 H. C. GOMS.